United States Patent Office 3,403,985
Patented Oct. 1, 1968

3,403,985
METHOD OF TREATING COATED-PARTICLE NUCLEAR-REACTOR FUELS
Ottmar Knacke, Aachen, and Manfred Laser, Erich Merz, and Hans-Jürgen Riedel, Julich, Germany, assignors to Kernforschungsanlage Julich des Landes Nordrhein-Westfalen-e.V., Julich, Germany, a corporation of Germany
No Drawing. Filed June 1, 1966, Ser. No. 554,339
Claims priority, application Germany, June 10, 1965, K 56,340
8 Claims. (Cl. 23—324)

ABSTRACT OF THE DISCLOSURE

A method of recovering components of coated-particle nuclear-reactor fuels containing uranium carbide as the nuclear-fuel element coated with pyrolytic carbon, silicon carbide, zirconium carbide, beryllium carbide, aluminum oxide, beryllium oxide or zirconium oxide, wherein the coated particles are reacted with a nonaqueous inorganic melt of sodium hydroxide or sodium peroxide at a temperature between 350° C. and 600° C. (preferably about 450° C.), the melt containing between 25 and 70 weight percent of a higher oxide (barium peroxide, sodium peroxide or potassium superoxide). Oxygen is introduced into the melt during the solution and the melt is granulated thereafter.

---

Our present invention relates to a method of recovering the valuable components of coated-particle nuclear-reactor fuels and thus to a process for dressing the spent coated particle fuels removed from a fission reactor.

The use of coated particles as nuclear fuels has become widespread for many types of nuclear reactors using solid fissionable materials. Such coated particles have a particle size of the order of several hundreds of microns and are coated with a variety of materials including, for example, pyrolytically precipitated carbon and/or silicon carbide, zirconium carbide, beryllium carbide, aluminum oxide, beryllium oxide and zirconium oxide. The core of the particle can be any of the usual fissionable materials; uranium and thorium oxides or salts have been employed for this purpose. After the particles have been utilized in a reactor cycle, i.e., have been subjected to fission in a reactor zone containing a critical mass of the fuel substance, it is desirable to treat the particles so as to recover therefrom reusable fissionable materials, valuable fission fragments if present, and materials which may be disposed of. It has been proposed heretofore to process coated particles of this character, after removal from the nuclear reactor, in a method involving the step of destroying the coating substance. Thus pyrolytic carbon coatings have been reacted with nitric acid and oxygen under pressure, have been subjected to a combustion step in oxygen, air or other oxygen-releasing compounds (e.g., $NO_2$), and have been treated by electrolytic processes. All of these methods of stripping the pyrolytic-carbon sheath or coating from the fuel substance have the disadvantage that they are ineffective when dealing with carbide and oxide coatings. Furthermore, a significant danger arises when the coatings of the particles or the encapsulated substances are carbides and the coating is stripped with the aid of nitric acid since, in that case, carbon monoxide may be formed and can lead to an explosion. Combustion processes using oxygen, air, or oxygen-releasing compounds for the treatment of combustible coatings generate substantial quantities of waste gases so that a substantial decontamination process must be carried out. Mechanical methods of disrupting, i.e., breaking away, the coating layer have been used with sheaths of pyrolytic carbon and/or silicon carbide, but have not found widespread application since these methods require hermetically sealed crushers and like apparatus to prevent the escape of gaseous fission fragments which are radioactive or otherwise poisonous to the surrounding atmosphere and personnel. This is especially inconvenient since it requires that the first stage of the process be carried out separately and at a location remote from the subsequent stages. Other chemical treatments for stripping of pyrolytic carbon and silicon carbide coatings have been found to be relatively slow and impractical in technological terms.

It is, therefore, a principal object of the present invention to provide an improved method of processing coated nuclear-fuel particles whereby the removal or stripping of the coating layer can be carried out relatively simply, quickly and effectively.

A further object of this invention is to provide an improved process for the recovery of valuable constituents from coated-particle nuclear fuels which is effective, rapid, requires no special apparatus, and which avoids the significant disadvantages discussed above while yielding the valuable components in a particularly satisfactory form.

We have found that these objects can be attained by a method of treating nuclear-fuel particles, sheathed with coatings of the type commonly used, i.e., pyrolytic carbon, carbides, and oxides, when the particles are reacted with a peroxydic substance in a liquid melt or bath of fused inorganic substances. Surprisingly, we have found that all of the aforementioned coating materials react rapidly with or are rapidly soluble in a fused inorganic bath or melt containing hyperoxides, peroxides, or other higher oxides in an oxide-containing melt. According to a feature of this invention, additional oxygen is introduced into the inorganic melt while the concentration of the oxydic component (i.e., the higher metal oxide, peroxide or hyperoxide) ranges between substantially 25 and 70 weight percent of the bath and the reaction is carried out at a temperature between 350 and 600° C. Preferably, the stripping reaction is effected at a temperature of about 450° C.

According to a more specific feature of this invention, the melt at the aforestated temperature of 350–600° C. contains between 25 and 70 percent of a higher oxide of one of the alkali or alkaline-earth metals of the Periodic Table (i.e., Groups I–A and II–A of the long form thereof), the higher oxide being generally stable and in a liquid state at the temperature of the bath. The balance of the melt can advantageously be constituted of fusible low-melting hydroxides or oxides of these metals provided they also have a melting point at or below the treatment temperature, the reaction being carried out in a nonaqueous solution of the higher oxide (preferably with the bubbling of additional oxygen into the melt).

A significant advantage of the present invention resides in the fact that the commonly used nuclear fuels (e.g., uranium or uranium compounds) are themselves easily soluble in the melt and thus can be recovered without difficulty from the latter. Best results are obtained when the higher oxide is potassium hyperoxide or superoxide ($KO_2$), sodium peroxide ($Na_2O_2$) or barium peroxide ($BaO_2$). Other hyperoxides or peroxides may also be used. The balance of the melt can be constituted most advantageously by sodium hydroxide or sodium carbonate since these substances, like the other low-melting point inorganic compounds mentioned above, effectively dissipate the reaction heat.

Surprisingly, it has been found that the present method can be used even with fuel masses containing substantial quantities of carbon in excess, this being the case when graphite is used as a moderator for the fission reaction or as the wall material for the fuel-element cells or channels.

According to a further feature of this invention, the melt, after solubilizing the nuclear fuel material and stripping therefrom the oxide, carbide or pyrolytic-carbon sheath, is granulated by permitting the melt to flow along a slightly inclined channel or trough onto a cool metal plate so arranged that the cascading melt forms granules upon solidification at contact with the plate. Addtional fuel particles are continuously added to the melt at the upper end of the trough which may be heated to bring the continuously added melt and the particles to the desired reaction temperature or to maintain the temperature of the melt at this temperature. By modifying the length of the trough and/or its inclination, the rate of throughput of the reaction components can be adjusted to ensure complete dissolution of the fuel and elimination of the coating. The apparatus is maintained in a hermetically sealed chamber so arranged that any gaseous fission fragments produced during the stripping operation can be carried away without difficulties. It is especially advantageous to carry out the reaction in a generally flat vessel when excess carbon is present since, in such a case, uncontrolled oxidation reactions with carbon are precluded. The additional oxygen introduced into the melt can be forced through perforated surfaces below the levels thereof by conventional means. The reaction vessel or trough can be composed of iron or nickel as well as from alloys thereof although refractory compounds such as magnesia, thoria and alumina are also effective for this purpose. The granules obtained by the method described above can be readily dissolved in water and subjected to neutralization with acid, and precipitated to yield the fuel-element oxides or salts.

EXAMPLE I

Uranium carbide ($UC_2$) particles coated with pyrolytic carbon by conventional methods and subjected to reaction in the fission zone of a nuclear reactor were dissolved in a melt consisting of 40% by weight sodium peroxide and 60% by weight sodium hydroxide after removal of the particles which had an average particle size of about 100–300 microns, in 300 ml. reaction vessels composed of pure nickel and aluminum oxide, respectively. The crucibles were heated to the reaction temperature by an electrically heated copper block immersed in the bath with temperature control by means of a thermocouple received in the block. The melt was agitated and mixed by gas injection below the surface of the melt from an alumina tube whose closed end was provided with fine perforations to disperse the gas in small bubbles.

In each of the vessels described, 50 g. of the above mentioned melt was used to treat 2 g. of the particles at a temperature of 550° C. In both cases, complete dissolution was observed after 30 minutes and analyses show that substantially all of the pyrolytic carbon was oxidized to carbon dioxide while the uranium carbide was reacted to eliminate the carbon component as carbon dioxide while solubilizing the uranium component as a peroxy uranate. The gas used in each vessel as the stirring medium was, in one experiment, nitrogen and in another experiment oxygen, and it was observed that in the second experiment in each crucible, a more rapid dissolution and elimination of carbon was obtained.

The melt was granulated by pouring it onto a cold plate and permitted to cool. Thereafter, the granules were dissolved in water, acidified and boiled to drive off residual carbon dioxide. The uranium component was precipitated as ammonium diuranate and heated to decomposition to yield $U_3O_8$. Substitution of $Na_2CO_3$ for the sodium hydroxide and equivalent amounts of $BaO_2$ and $KO_2$ for the $Na_2O_2$ gave similar results.

EXAMPLE II

The experiments of Example I were carried out similarly in all respects except that the melt temperature was reduced to 450° C. and, at this temperature, the slowest time required for total solubilization of the particles was 1.5 hours. Thus it can be seen that a reduction of the reaction temperature is accompanied by an increase in the reaction time. The reduced temperature, however, resulted in reduced corrosion and increased life in the reaction vessels.

EXAMPLE III

Following the method generally outlined in Example I, 1 g. of uranium carbide fuel particles having a triple layer of coating material consisting, in order, of pyrolytic carbon, silicon carbide and pyrolytic carbon was dissolved in 80 g. of a mixture consisting of 45 parts by weight sodium peroxide and 55 parts by weight sodium hydroxide. The reaction vessel was pure nickel and had a volume of 250 ml. The bath was heated to a temperature of 530° C. by a copper block disposed in the crucible below the level of the bath and a mechanical stirrer was used to admix the melt. The crucible was covered with a stopper having three openings serving respectively to receive the mechanical stirrer, to supply the particles and to remove the gases. After a reaction time of about 1.5 hours, it was observed that the particles had been quantitatively reacted and solubilized. After granulation in the manner described, the solidified melt was dissolved in water acidified with nitric acid and decanted to remove the uranium containing liquid as a clear solution from the precipitated silica particles.

EXAMPLE IV

Using the method and conditions of Example I, except that the coated particles also were accompanied by a significant quantity of graphite, it was found that substantially all of the graphite was oxidized to carbon dioxide during solubilization of the particles. Here the alumina crucible was used with a volume of 250 ml. and electric heating as indicated earlier. Mixing of the melt was effected with a slow stream of nitrogen at a temperature of about 460° C., 1 g. of the particles and 0.5 g. of graphite were completely reacted in the sodium peroxide/ sodium hydroxide bath. When the temperature was raised to 550° C. an additional 0.75 g. of the graphite can be oxidized to carbon dioxide within the two hours reaction time. If the temperature is raised to 600° C., it is observed that an additional 0.25 g. of graphite can be oxidized in one hour. Thus, in a period of 4.5 hours, a 150 g. melt of the composition described quantitatively reacts or dissolves 1 g. of nuclear-fuel particles and 1.5 of graphite. It is apparent that, since the pyrolytic carbon present consists of about 0.5 g. of carbon, it is possible when no graphite is present, to solubilize completely—under the conditions indicated—4 g. of nuclear-fuel particles coated with pyrolytic carbon.

We claim:
1. A method of destroying the coating and of recovering the components of coated particles of a nuclear-reactor fuel in which a sheath of a substance selected from the group which consists of pyrolytic carbon, silicon carbide, zirconium carbide, beryllium carbide, aluminum oxide, beryllium oxide and zirconium oxide surrounds and encloses a nuclear-fuel element, comprising the step of reacting coated particles of nuclear fuel, in which a sheath of substance selected from the group which consists of pyrolytic carbon, silicon carbide, zirconium carbide, beryllium carbide, aluminum oxide, beryllium oxide and zirconium oxide surrounds and encloses a nuclear-fuel element with a nonaqueous inorganic melt at a temperature between 350° C. and 600° C. and containing between 25 and 70 weight percent of at least one higher inorganic oxide selected from the group which consists of superoxides and peroxides of alkali and alkaline-earth metals until said particles are dissolved in said melt.

2. The method defined in claim 1 wherein said bath is maintained at a temperature of the order of 450° C.

3. The method defined in claim 1 wherein said higher oxide is selected from the group consisting of barium peroxide, sodium peroxide or potassium superoxide.

4. The method defined in claim 1, further comprising the step of injecting oxygen into the melt during the dissolution of said particles.

5. The method defined in claim 1 further comprising the step of granulating the melt after dissolution of said particles therein.

6. The method defined in claim 1 wherein said melt contains at least one compound from the group which consists of low-melting-point hydroxides and carbonates of alkali metals.

7. The method defined in claim 6 wherein said melt consists in major part of a compound from the group of sodium hydroxide and sodium peroxide and said nuclear-fuel element contains uranium.

8. The method defined in claim 7 wherein said nuclear-fuel element is uranium carbide.

References Cited

UNITED STATES PATENTS 3,322,509    5/1967    Vogg _____ 75—84.1

CARL D. QUARFORTH, *Primary Examiner.*

M. J. SCOLNICK, *Assistant Examiner.*